(12) United States Patent
Heyl et al.

(10) Patent No.: US 12,420,817 B2
(45) Date of Patent: Sep. 23, 2025

(54) METHOD FOR OPERATING A MANAGEMENT PROGRAM

(71) Applicant: Robert Bosch GmbH, Stuttgart (DE)

(72) Inventors: Andreas Heyl, Weil der Stadt (DE); Markus Schweizer, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 196 days.

(21) Appl. No.: 18/052,230

(22) Filed: Nov. 3, 2022

(65) Prior Publication Data

US 2023/0143312 A1    May 11, 2023

(30) Foreign Application Priority Data

Nov. 9, 2021   (DE) .................. 10 2021 212 600.6
Nov. 16, 2021  (DE) .................. 10 2021 212 858.0

(51) Int. Cl.
*B60W 50/08* (2020.01)

(52) U.S. Cl.
CPC ....... *B60W 50/082* (2013.01); *B60W 2556/45* (2020.02)

(58) Field of Classification Search
CPC .......... B60W 50/082; B60W 2556/45; B60W 50/0098; B60W 50/14; B60W 2050/0075; B60W 2050/0095; B60R 16/023; B60Q 9/00
See application file for complete search history.

(56) References Cited

U.S. PATENT DOCUMENTS

2003/0200016 A1*  10/2003  Spillane ................. B60K 28/16
                                                          701/36
2022/0332347 A1*  10/2022  Rottkamp .......... B60W 60/0011

FOREIGN PATENT DOCUMENTS

DE    102014209489 A1    11/2015
DE    102015221949 A1 *   5/2017

\* cited by examiner

*Primary Examiner* — Abby Y Lin
*Assistant Examiner* — Dylan M Katz
(74) *Attorney, Agent, or Firm* — NORTON ROSE FULBRIGHT US LLP

(57) ABSTRACT

A method for operating a management program that is provided to manage at least one intervention from at least one application program in a motor vehicle into at least one component of the motor vehicle. When establishing the extent of the at least one intervention, information being made available from outside of the vehicle is taken into account.

10 Claims, 2 Drawing Sheets

METHOD FOR OPERATING A MANAGEMENT PROGRAM

FIELD

The present invention relates to a method for operating a management program and a system for carrying out the method.

BACKGROUND INFORMATION

The above-described management program is provided to manage interventions from at least one application program, in particular an application program for mobile devices or mobile operating systems. Application programs or application software are/is used in different areas. In this case, application programs that are configured for use in mobile devices, such as for example smartphones or tablets, or for mobile operating systems are considered in particular. Such an application program is, in short, also referred to as an app. Such apps are also used in connection with vehicles, even in the case of autonomous, i.e., automatedly driving, vehicles.

In this way, functions or driver assistance functions may be subsequently introduced into the vehicle via apps that represent downloadable functions. This is carried out even if the vehicle is already in the field.

In this case, the apps may either be subsequently downloaded and executed in the vehicle, for example in a vehicle control unit, or outside of the vehicle, for example in a smartphone or in a cloud that is connected to the vehicle.

One interesting possibility presents itself when the app concept known from the CE (consumer electronics) world (smartphones, tablets) is transferred to the motor vehicle, i.e., making it possible for any developer to write and offer apps. This may give rise to completely new application possibilities, as is known from the CE world, also in the automotive field, in particular if the apps implement driver assistance functions. For this purpose, the downloadable functions, however, need access to actuators and may carry out actions that are potentially security-relevant. It is thus necessary to take safety requirements into account.

It is to be noted that apps transfer and process interventions, in particular external interventions, for example from a web browser or a cloud, which in many cases originate from unsecured environments, such as for example development processes, hardware, software, and do not meet any safety standards. They thus do not meet ASIL-X, but only QM, i.e., as in the case of comfort consumers. It is therefore necessary to delimit their intervention strength. Thus, the argument may be made that the physical effect of erroneous interventions also always remains controllable for the driver, as described in German Patent Application No. DE 10 2014 209 489 A1.

German Patent Application No. DE 10 2014 209 489 A1 describes a coupling device for coupling a software component in a motor vehicle that makes it possible to securely integrate the software component into a motor vehicle. The software component is configured to transmit a positioning request to a control system of a motor vehicle. The coupling device includes a monitoring unit that is configured to carry out an evaluation for each positioning request, as to whether its implementation would transfer the motor vehicle into a dangerous state. The coupling device is further configured to transmit, as a function of this evaluation, a positioning request, which is monitored according to the positioning request, to an implementation unit, the implementation unit being configured to activate an actuator.

With the aid of the limitation described in the above-mentioned publication, the usability of these apps is limited, however. An expansion of the limits would provide the user with more advantages, more comfort, etc.

For higher levels of automation (L2+, L3, L4), an automated driving system (ADS) takes over the driving of the vehicle. In this case, ADS takes over all tasks required for driving and monitors the driving surroundings. The controllability thus also changes; in particular an ADS is in most cases better at controlling, compensating for or mitigating requirements that are not appropriate in the situation. An ADS is thus, for example, able to respond more quickly to arising dangerous situations. An expansion of the characteristic curves for the limitation of the external intervention is thus possible.

However, for the human driver as well as for an ADS, the instantaneous state of the surroundings, i.e., the number and kind of static and dynamic objects, the complexity of the (traffic) situation, the presence of pedestrians, some of whom behave erratically, the weather conditions, the lighting conditions, etc., has a great influence on the ability of the driver or the system to safely and reliably handle the situation even in the case of unexpected developments in the surroundings or in the case of erroneous or inappropriate internal requirements, for example external/app requirements.

SUMMARY

According to the present invention, a method as well as a system are provided for operating a management program. Specific embodiments result from the disclosure herein.

According to an example embodiment of the present invention, the method is used for operating a management program that is provided to manage at least one intervention from at least one application program in a motor vehicle into at least one component of the motor vehicle, in which when establishing the extent of the at least one intervention, information being made available from outside of the vehicle is taken into account.

"Managing an intervention" means that the management program is configured to correspondingly forward or process an intervention, which is potentially externally requested, so that this intervention may be carried out.

Components of the motor vehicle may be hardware and/or software components of the motor vehicle. Furthermore, components may be considered with regard to them carrying out or implementing certain functions in the motor vehicle.

The extent of an intervention determines the scope of this intervention, i.e., to what extent which components may be intervened in or accessed. It may thus be established, which components may be accessed at all by which application program and in what scope this access is permitted.

According to an example embodiment of the present invention, a method is provided, in which, as a function of external or outside information, for example from a cloud or a web browser, the limitations of the interventions by downloadable functions, i.e., apps, for example via a web browser or a cloud, etc., are expanded or limited externally, in particular. This results in the advantage that these functions may carry out stronger interventions, if the conditions are ideal, for example when driving during the day in areas having a low traffic volume, and that the interventions are limited, if the potential risk is greater, for example when driving during the night in a city having a high traffic volume. In addition to the cloud and web browser, a so-called edge computing system and an infrastructure system, for example a system mounted on traffic lights and including a camera, a computer, and a communication unit, may also be used as an external system.

In this case, it is particularly advantageous that the cloud and web browser systems have a more extensive overview over the instantaneous overall traffic and surroundings situation than the individual vehicle with its very local view based on the vehicle sensors and also the driver, whose view is potentially also impaired.

Further advantages and embodiments of the present invention are derived from the description herein and the figures.

It is understood that the above-mentioned features and the features to be elucidated below are usable not only in the given combination, but also in other combinations or alone without departing from the scope of the present invention.

DETAILED DESCRIPTION OF EXAMPLE EMBODIMENTS

The present invention is illustrated schematically in the figures on the basis of specific embodiments and is described in greater detail in the following with reference to the figures.

Figure 1:
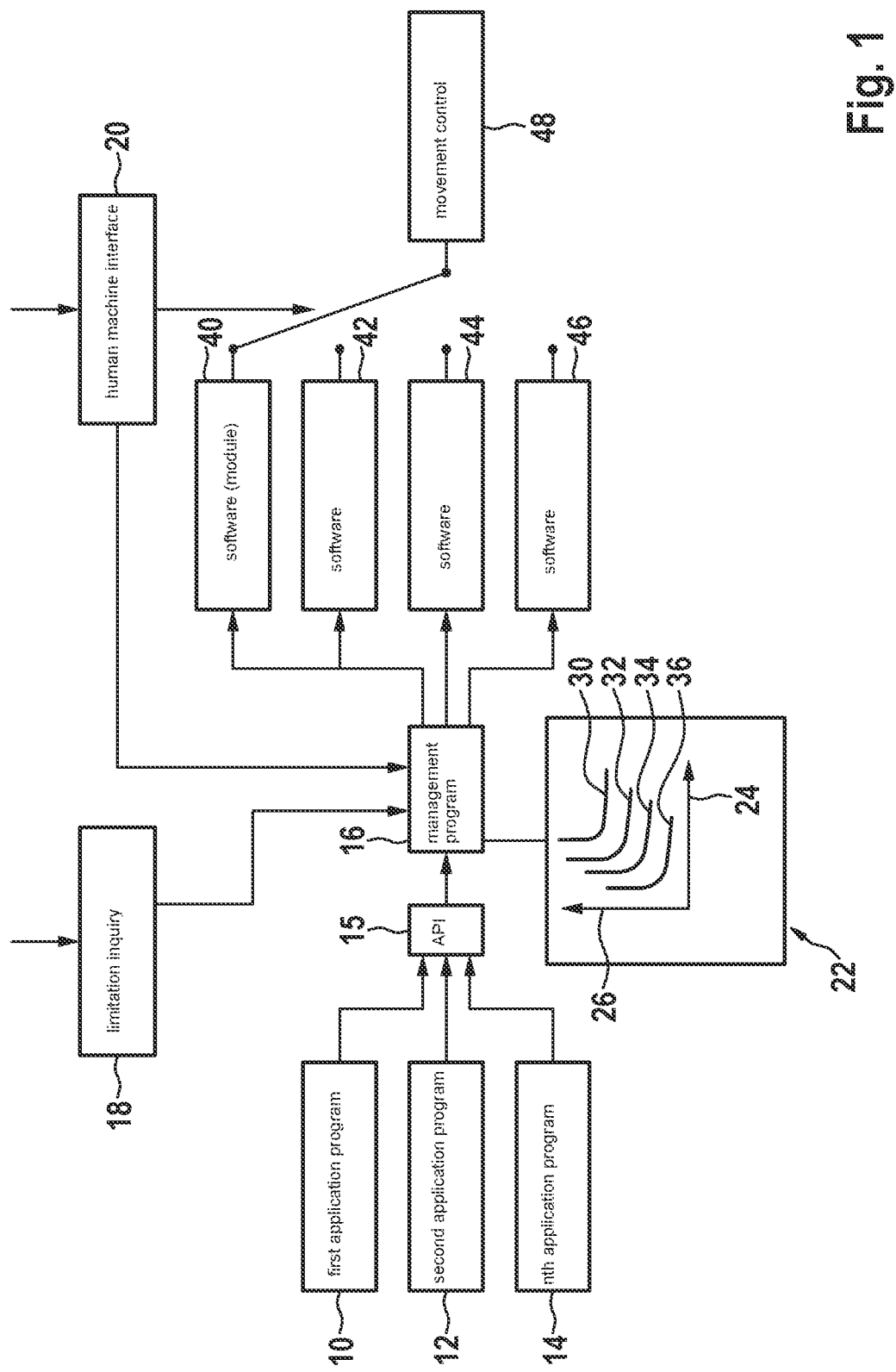
FIG. 1 shows a flowchart of one specific embodiment of a method according to the present invention.

FIG. 1 describes a possible sequence of the method presented above. The illustration shows a first application program App_1 10, a second application program App_2 12, and an nth application program App_n 14. These application programs 10, 12, 14 provide input signals for a management program 16, which receives same via an application interface App API 15. Further input signals are provided by a limitation inquiry 18, in which, in turn, a piece of information from an external unit, such as for example a cloud or a web browser, is input, and furthermore by a human machine interface 20, in which an entry is input by a driver and in which a piece of information with regard to a selection of an AD module (CCU) is input. CCU is the so-called connectivity control unit, i.e., the communication module of the vehicle for external communication, for example LTE, 5G, Wi-Fi, etc.

Management program 16 takes into account the characteristic curves from a safety features map, on which abscissa 24 p2 and its ordinate 26 p1 are plotted. p1 and p2 are parameters, for example velocity and the maximally permitted brake intervention or steering intervention. In this map 22, a first characteristic curve 30 is plotted for L4, a second characteristic curve 32 is plotted for L3.1, a third characteristic curve 34 is plotted for L3.2, and a fourth characteristic 36 is plotted for L3.3. L1 through L4 indicate different driving modes that are elucidated in greater detail in the following.

Management program 16 provides output signals for L1 SW (software) 40, L2 SW 42, L3 SW 44, and L4 SW 46. L1 SW 40 together with an output signal from human machine interface 20 provides a piece of information to a movement control 48. Management program 16 manages in this way the interventions by apps 10, 12, 14 into the components of a vehicle.

Modules 40, 42, 44, and 46 are functions for automated driving, for example automated emergency braking (AEB) including in particular radar-based object recognition and brake intervention (L2) or the various system elements for fully automated driving (L4), such as perception, surroundings model generation, behavior and trajectory planning.

Depending on the driving mode and external information, a different characteristic curve is selected for the intervention, here for example L3. x for L3, whose compliance is ensured by application interface App_API 16. The app interventions ("App_x") may take place from within the vehicle system, for example a control unit or a software, or from outside, for example a cloud, a web browser, a smartphone, etc.

With regard to the individual driving modes, the following is carried out:

The driver controls the vehicle using driver assistance either in the longitudinal direction or in the transversal direction (L1), as is also described in German Patent Application No. DE 10 2014 209 489 A1.

The ADS controls, the driver observes the vehicle with hands on the steering wheel (L2).

The ADS controls, the driver observes the vehicle without hands on the steering wheel (L2 hands-free).

The ADS controls, the driver does not observe the vehicle, but must be able to take control within a certain period of time (L3).

The ADS controls, the driver does not have to observe nor be able to intervene (L4).

Possible external systems that are capable of evaluating the meaning or the criticality of the instantaneous situation are:
  cloud backend,
  local web browser systems, for example an infrastructure system,
  local spatial computer platform,
  network of linked road users (V2X),
  dynamic map.

To determine the external complexity of the situation, the following is carried out:

The external system determines the complexity of the situation based on, for example,
  weather conditions,
  traffic density,
  evaluation of the risk or the meaning of the traffic situation, for example high versus low velocities of the other road users, small versus great distances, short versus long average TTC (time-to-collision), whether it is necessary or possible to drive past cyclists, for example, at a close versus at a great distance, bad versus good overview or visibility of the traffic situation, no versus many pedestrians, road users moving erratically versus normally, etc.,
  risk or meaning or criticality metrics reported from vehicles and aggregated for the traffic situation.

The complexity may in this case be indicated as a continuous, for example within a range [0, 1], or a discrete parameter, for example low, medium, high.

The limitations for ensuring the controllability on the system level, i.e., ADS, or on the vehicle level, namely the driver, may refer to the following interventions:
  actuator-specific interventions, for example engine, brakes, steering, but also lights, seat adjustment, active suspension, etc.,
  movement-specific interventions, for example longitudinal, lateral, vertical.

The external intervention via the criticality parameter may take place either
- directly, i.e., in an externally controlled manner, and cannot be internally overridden in the implementation, or
- indirectly, i.e., as a recommendation that may also be dismissed or compared to one's own criticality evaluation.

For the adjustment of the limitations, the following is carried out:
- switching over the limitation characteristic curves depending on the driving mode and externally determined criticality of the instantaneous situation,
- run-up phase/drop phase during the transition between the modes or characteristic curves to avoid abrupt changes in control, error messages and/or a termination of the external intervention due to error detection, controlled by application interface App API 16 and/or supported by apps 10, 12, 14 by providing appropriate transition characteristic curves,
- optional warning of the driver, for example acoustically, visually and/or haptically with the aid of a human machine interface, when adjusting the limitations.

The management of the limitations takes place in management program 16.

Management program 16, which may be regarded as a part of API 15, of the app interventions should report back the instantaneously pertinent limitations or also, prognostically, future limitations to apps 10, 12, 14, so that same are able to respond to them accordingly in terms of regulation.

The description of application interface App API 16 should include these different areas of intervention, which depend on the degree of automation, so that app developers may take this into account when developing new functions.

Figure 2:
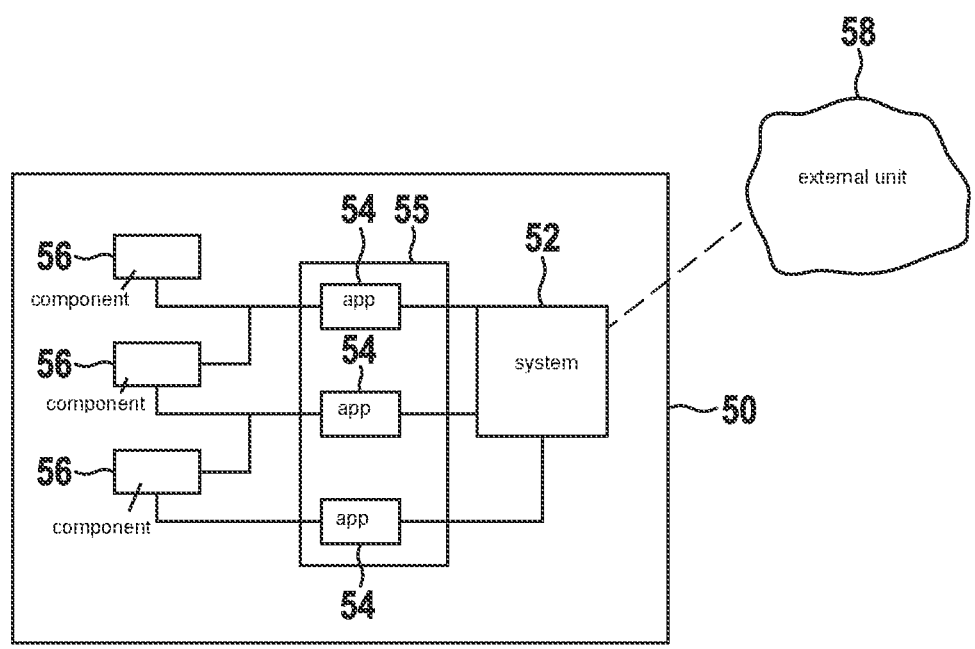
FIG. 2 shows in a schematic illustration a motor vehicle including a system for carrying out the method, according to an example embodiment of the present invention.

FIG. 2 shows in a schematic illustration and heavily simplified form a motor vehicle that is denoted overall by reference numeral 50. A system for carrying out the method presented here is provided in this motor vehicle 50. This system 52 manages a series of apps 54 that in turn have access to components 56 of motor vehicle 50 or manage accesses to these components 56 and are stored in a mobile unit 55. Information from an external unit 58, for example a cloud, is taken into account to establish the extent of the accesses of individual apps 54 to individual components 56. It is to be noted that apps 54 may also be regarded as components 56 of motor vehicle 50, which may be accessed.

What is claimed is:

1. A method for operating a management program that is provided to manage at least one intervention from at least one application program in a motor vehicle into at least one component of the motor vehicle, the method comprising:
taking into account information provided from outside of the vehicle when establishing an extent of the at least one intervention, wherein:
the at least one intervention corresponds to an intervention into a movement of the motor vehicle that is determined by the at least one application program, wherein establishing the extent of the at least one intervention includes controlling the extent of the at least one intervention into the movement of the motor vehicle in accordance with the information provided from outside the vehicle and in accordance with a selected one of a plurality of characteristic curves that respectively correspond to a plurality of driving modes, wherein the one of the plurality of characteristic curves is selected based on the information provided from outside of the vehicle.

2. The method as recited in claim 1, wherein the at least one intervention takes place internally.

3. The method as recited in claim 1, wherein the at least one intervention takes place externally.

4. The method as recited in claim 1, wherein the at least one application program is configured to implement a driver assistance system.

5. The method as recited in claim 1, wherein the extent of the at least one intervention is limited.

6. The method as recited in claim 1, wherein the extent of the intervention is expanded.

7. The method as recited in claim 1, wherein a transition is carried out between the characteristic curves.

8. The method as recited in claim 7, wherein during the transition between the characteristic curves, a run-up phase and a drop phase are taken into account.

9. The method as recited in claim 1, wherein at least one criticality parameter is taken into account.

10. A system for operating an application program that is provided to manage at least one intervention from at least one application program in a motor vehicle into at least one component of the motor vehicle, the system configured to:
take into account information provided from outside of the vehicle when establishing an extent of the at least one intervention, wherein:
the at least one intervention corresponds to an intervention into a movement of the motor vehicle that is determined by the at least one application program, wherein establishing the extent of the at least one intervention includes controlling the extent of the at least one intervention into the movement of the motor vehicle in accordance with the information provided from outside the vehicle and in accordance with a selected one of a plurality of characteristic curves that respectively correspond to a plurality of driving modes, wherein the one of the plurality of characteristic curves is selected based on the information provided from outside of the vehicle.

* * * * *